United States Patent
Liang et al.

(10) Patent No.: US 12,448,529 B2
(45) Date of Patent: Oct. 21, 2025

(54) COATING WITH AN ORDERED SPATIAL DISTRIBUTION OF NANOPARTICLES

(71) Applicant: VIAVI SOLUTIONS INC., San Jose, CA (US)

(72) Inventors: Kangning Liang, Santa Rosa, CA (US); Jaroslaw Zieba, Santa Rosa, CA (US); Alberto Argoitia, Santa Rosa, CA (US); Johannes P. Seydel, Petaluma, CA (US)

(73) Assignee: VIAVI SOLUTIONS INC., Chandler, AZ (US)

(*) Notice: Subject to any disclaimer, the term of this patent is extended or adjusted under 35 U.S.C. 154(b) by 602 days.

(21) Appl. No.: 17/158,894

(22) Filed: Jan. 26, 2021

(65) Prior Publication Data
US 2022/0235235 A1    Jul. 28, 2022

(51) Int. Cl.
| | | |
|---|---|---|
| *C09D 7/40* | (2018.01) | |
| *B32B 5/16* | (2006.01) | |
| *B32B 27/08* | (2006.01) | |
| *B32B 27/14* | (2006.01) | |
| *B82Y 30/00* | (2011.01) | |
| *B82Y 40/00* | (2011.01) | |
| *C09D 201/00* | (2006.01) | |

(52) U.S. Cl.
CPC ............... *C09D 7/67* (2018.01); *B32B 5/16* (2013.01); *B32B 27/08* (2013.01); *B32B 27/14* (2013.01); *C09D 201/00* (2013.01); *B32B 2260/025* (2013.01); *B32B 2260/046* (2013.01); *B32B 2307/418* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 2008/0122927 A1* | 5/2008 | Konno | ............... | H04N 7/183 |
| | | | | 348/E5.029 |
| 2010/0157437 A1 | 6/2010 | Higginson et al. | | |
| 2016/0231563 A1* | 8/2016 | Teramoto | ............... | G02B 5/003 |

FOREIGN PATENT DOCUMENTS

| | | | | |
|---|---|---|---|---|
| CN | 101506691 A | 8/2009 | | |
| CN | 104487872 A | 4/2015 | | |
| CN | 104411745 B | 8/2017 | | |
| CN | 107073880 A | 8/2017 | | |
| CN | 112080021 A | 12/2020 | | |
| JP | 2013137559 A | * 7/2013 | ............ | G02B 1/105 |
| JP | 2015092201 A | 5/2015 | | |
| KR | 20090044089 A | * 5/2009 | | |
| KR | 20090066704 A | 6/2009 | | |
| WO | 2012044522 A1 | 4/2012 | | |
| WO | 2013125179 A1 | 8/2013 | | |
| WO | 2019005278 A1 | 1/2019 | | |

OTHER PUBLICATIONS

Choi et al., KR 20090044089-A, May 7, 2009 (machine translation) (Year: 2009).*
Sasaki et al. WO 2013/125179, Aug. 29, 2013 (machine translation) (Year: 2013).*
Parabolix, "Fresnel Lens and Parabolic Reflectors", Aug. 7, 2020 <https://www.parabolixlight.com/fresnel-lens-and-parabolic-reflectors> (Year: 2020).*
Horio et al., JP-2013137559-A, Jul. 11, 2013 (machine translation) (Year: 2013).*
Korean Intellectual Property Office, "Including English translation of the Notice to Submit Response for Korean Application No. 10-2022-0008128", dated Feb. 21, 2025, 12 pages.

* cited by examiner

*Primary Examiner* — Cheng Yuan Huang
(74) *Attorney, Agent, or Firm* — Mannava & Kang, P.C (57) ABSTRACT

A coating including an ordered spatial distribution of a plurality of nanoparticles; and a polymer medium is disclosed. Also disclosed is an article, such as an optical device, can include the coating, on a substrate. A multilayer structure can include the coating with a high refractive index layer adjacent to the coating. A method of making the coating, the article, and the multilayer structures is disclosed.

13 Claims, 5 Drawing Sheets

COATING WITH AN ORDERED SPATIAL DISTRIBUTION OF NANOPARTICLES

FIELD OF THE INVENTION

The present disclosure generally relates to a coating including an ordered spatial distribution of a plurality of nanoparticles; and a polymer medium. An article, such as an optical device, can include the coating, on a substrate. A multilayer structure can include the coating with a high refractive index layer adjacent to the coating. A method of making the coating, the article, and the multilayer structures is disclosed.

BACKGROUND OF THE INVENTION in order to increase the refractive index of an optical coating, high refractive index nanoparticles are dispersed into a polymer medium. However, the refractive index across the optical coating remains unchanged because the nanoparticles are statistically uniformly distributed/dispersed in the coating.

Some optical coatings require special engineered distributions of refractive indices. Until the present invention, the only way to create the engineered distribution was to provide an optical device including multiple optical coatings in which each coating had a specific refractive index. In this manner, the optical device could be engineered to provide alternating layers of low and high refractive indices.

Alternatively, an optical device could include multiple layers in which each layer has a slightly different refractive index than an adjacent layer in order to create the engineered distribution. However, the resultant optical device was expensive to make and too thick due to the number of layers required to produce the engineered distribution.

What is needed is a coating, such as a single coating, that can include nanoparticles that are distributed in a way to realize the engineered distribution required for some articles.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed a coating including an ordered spatial distribution of a plurality of nanoparticles; and a polymer medium.

In another aspect, there is disclosed a method of making a coating including providing a plurality of nanoparticles dispersed within a composition including a polymer medium; applying a field to the composition, wherein the field is chosen from an electromagnetic, an electric, a magnetic, a gravitational, and combinations thereof; and ordering, in a spatial distribution parallel to the electric field, the plurality of nanoparticles.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures. Any references to "top" or "bottom" are for ease of understanding positions relative to another element and should not be considered limiting. Additionally, if more than one element is present, then the element is identified as a first, second, third, etc. for ease of understanding.

In its broad and varied embodiments, disclosed herein is a coating, an article, such as an optical device including the coating, a multilayer structure including the coating; and methods of making and using the coatings, articles, and multilayer structures.

Figure 1:
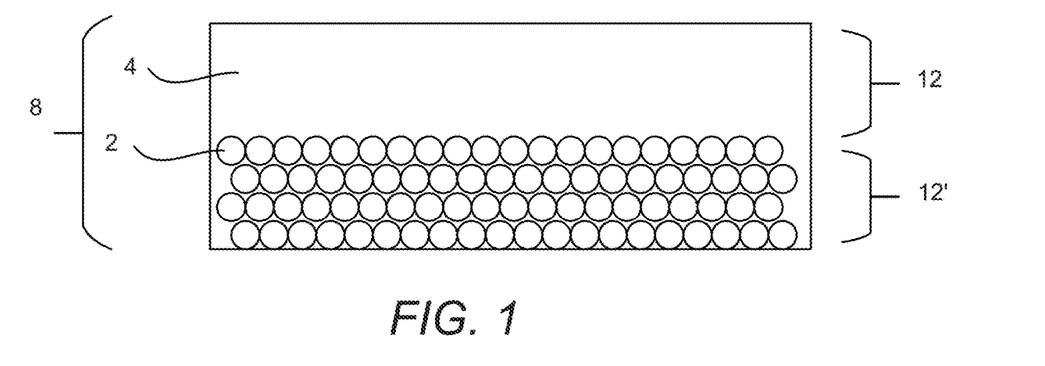
FIG. 1 is a coating according to an aspect of the invention.
Figure 2:
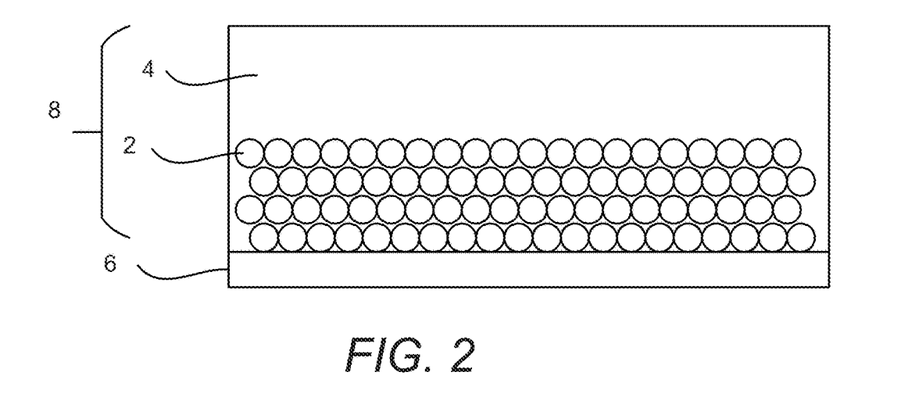
FIG. 2 is a coating with a substrate according to an aspect of the invention.
Figure 3:
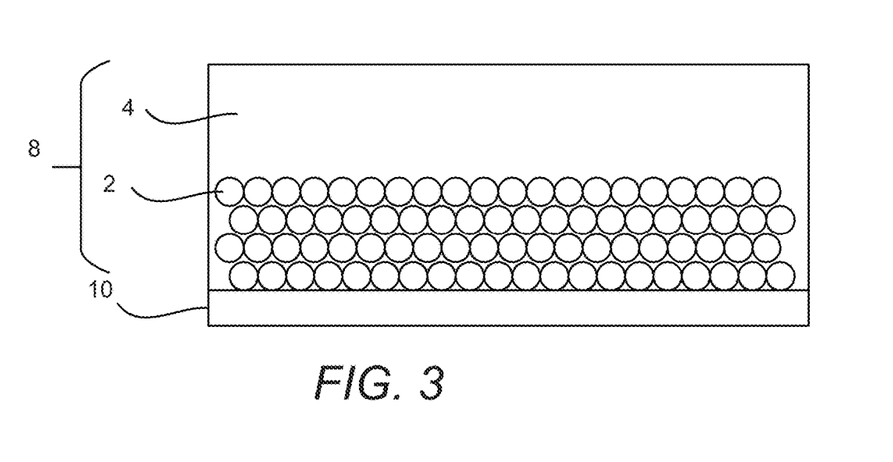
FIG. 3 is a coating with an additional layer according to an aspect of the invention.
Figure 4:
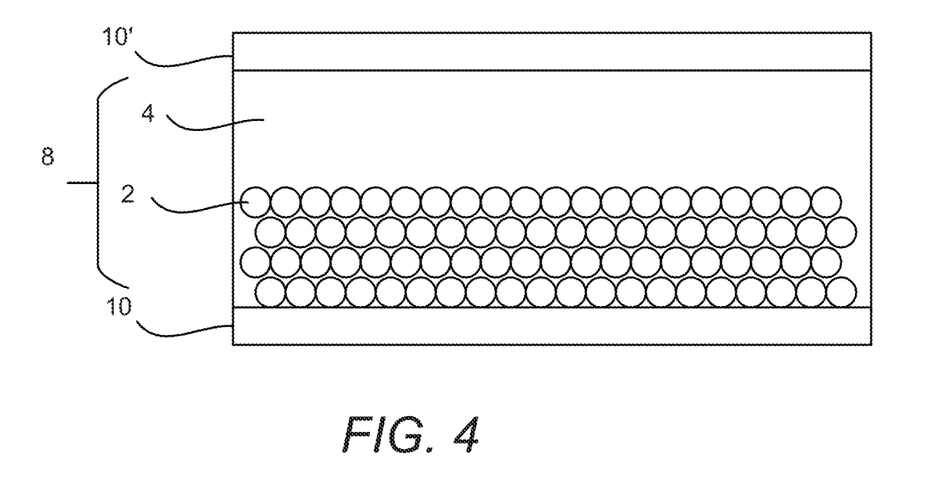
FIG. 4 is an article including a coating, a first additional layer, and a second additional layer according to an aspect of the invention.
Figure 5:
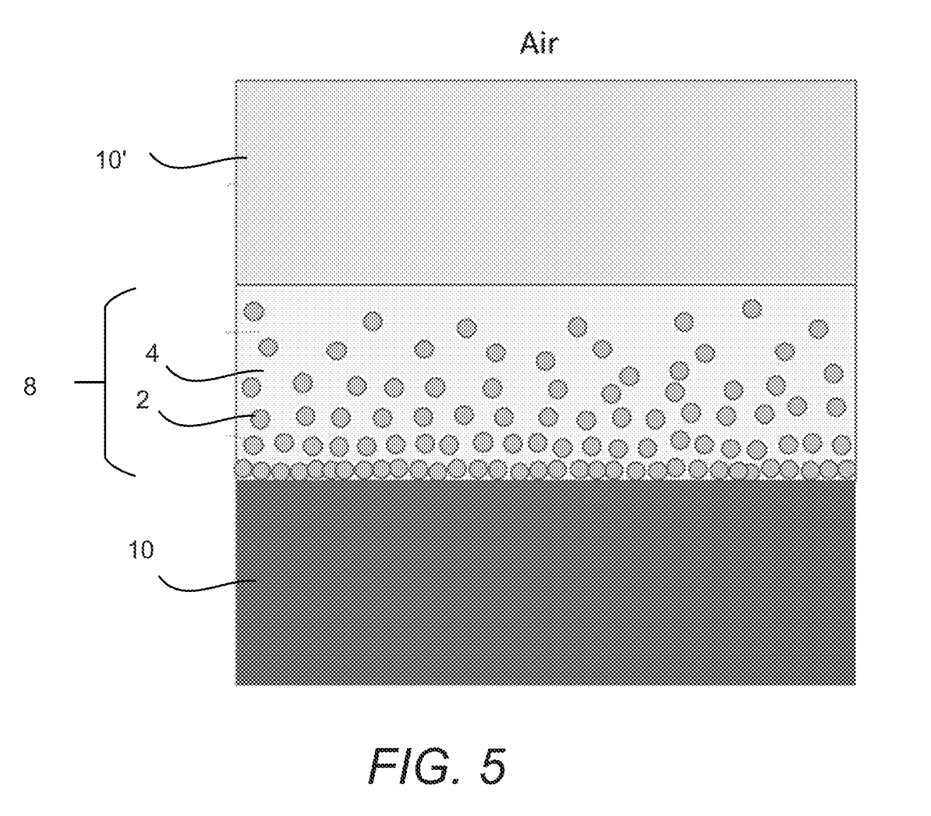
FIG. 5 is an article according to another aspect of the invention.
Figure 6:
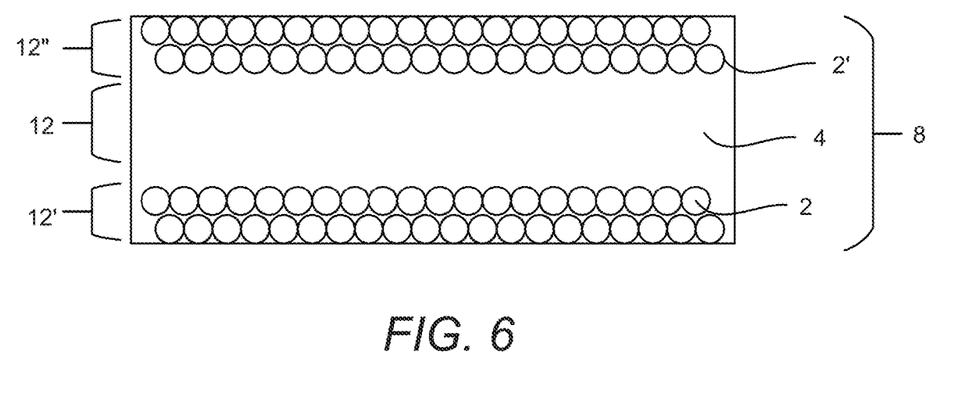
FIG. 6 is a coating according to another aspect of the invention.
Figure 9:
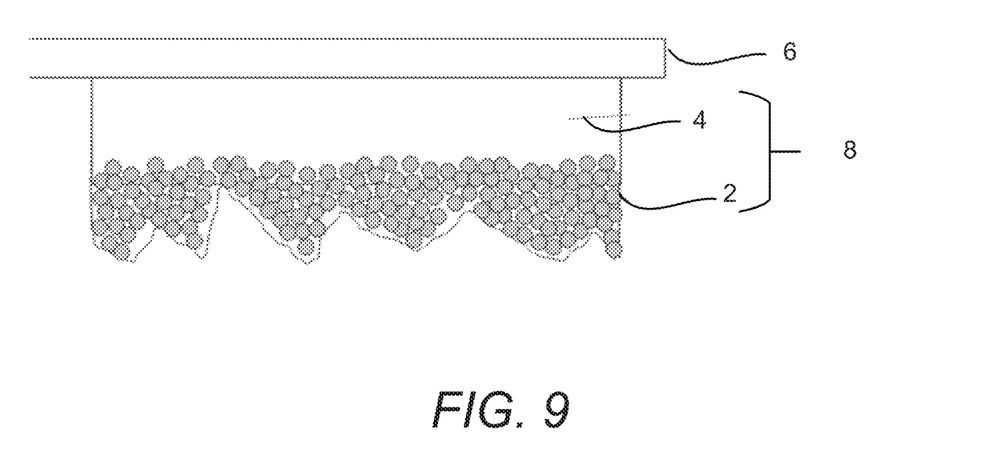
FIG. 9 is an article according to another aspect of the invention.

The present disclosure describes a coating 8 comprising an ordered spatial distribution of a plurality of nanoparticles 2; and a polymer medium 4, for example, as shown in FIGS. 1 and 6. The coating 8 can be deposited on a substrate 6 to form an article, such as an optical device, for example, as shown in FIG. 2. The article can be a light diffuser, a planar lens, or an optical filter, for example, as shown in FIG. 9. In another aspect, the coating 8 can be adjacent to an additional layer, such as a high refractive index layer, in a multilayer structure, for example, as shown in FIGS. 3-5.

As shown in FIG. 1, the coating 8 can be a single coating, or layer, deposited in a single coating step so that there are zero coating interfaces within the coating 8. There can be an interface between a nanoparticle 2 and the polymer medium 4 within the coating 8. The coating 8 can have an ordered spatial distribution of the nanoparticles 2 within the coating 8, such as along one or more surfaces, or in a gradient between surfaces, for example, as shown in FIGS. 1-5 and 9.

There can be different portions 12, 12', 12" of nanoparticles 2, 2' that can be used to describe the ordered spatial distribution of nanoparticles 2, 2' within the coating 8. For example, as shown in FIGS. 1 and 6, a first portion 12 can be void of or include trace amounts of nanoparticles 2, 2' so that the first portion 12 can be the polymer medium 4 with a low solids content relative to other portions. In this manner, the physical property, such as a refractive index, of the polymer medium 4 can be nearly unchanged. A second portion 12', and/or a third portion 12" can include a high concentration of nanoparticles 2, 2' to that the second portion 12, and/or the third portion 12" has a high solids content relation to other portions. In this manner, the physical property of the nanoparticles 2, 2' can be a factor for that portion.

In an example, the coating 8 can have different portions, such as a first portion 12, a second portion 12', and a third portion 12", in which each different portion has a different property, such as a physical property, that can be used to provide an ordered spatial distribution to a plurality of nanoparticles 2, 2' as shown in FIG. 6. The coating 8 can have an ordered spatial distribution, for example, based upon density of nanoparticles 2, 2'. A gravitational field can be applied to the coating 8 so that low density nanoparticles 2' are located at a third (top) portion 12" of the coating 8 and high density nanoparticles 2 are located at a second (bottom) portion 12' of the coating 8. The first portion 12 can have trace amounts or be void of nanoparticles 2. In this manner, the coating 8 can have an ordered spatial distribution of nanoparticles 2 based upon density of the plurality of nanoparticles 2, 2' in the polymer medium 4.

Figure 7:
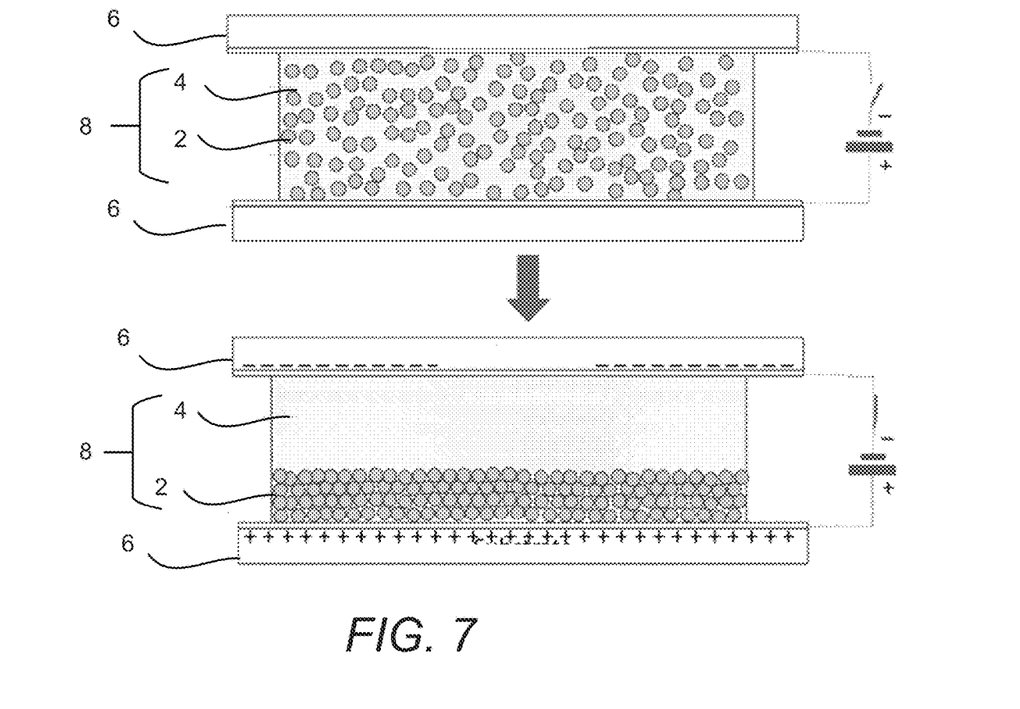
FIG. 7 is an illustration of a method of making a coating according to an aspect of the invention.

In another example, the coating 8 can have an ordered spatial distribution based upon a refractive index of the nanoparticles 2 within the coating 8, such as along a surface, or in a gradient between surfaces. For example, the coating 8 can include a refractive index gradient in which the refractive index increases from one surface to an opposing surface, for example as shown in FIG. 5. As another example, the coating 8 can have different portions, such as a first portion 12 and a second portion 12', in which the second portion 12' has a high refractive index and the first portion 12 has a low refractive index, relative to each other. Referring to FIG. 7, the coating 8 in the top illustration can have a refractive index ($n_{coating}$) based upon the random distribution of the plurality of nanoparticles 2 dispersed in the polymer medium 4. The coating 8 in the bottom illustration can have different portions, such as a first portion 12 and a second portion 12', that can form an ordered spatial distribution of nanoparticles 2. Referring to FIG. 1, the first (top) portion 12 can have a refractive index ($n_{polymer\ medium}$), which is similar to the refractive index of the neat polymer medium 4. The second (bottom) portion 12' can have a refractive index ($n_{nanoparticle}$), which is similar to the refractive index of the neat nanoparticle 2.

Figure 10:
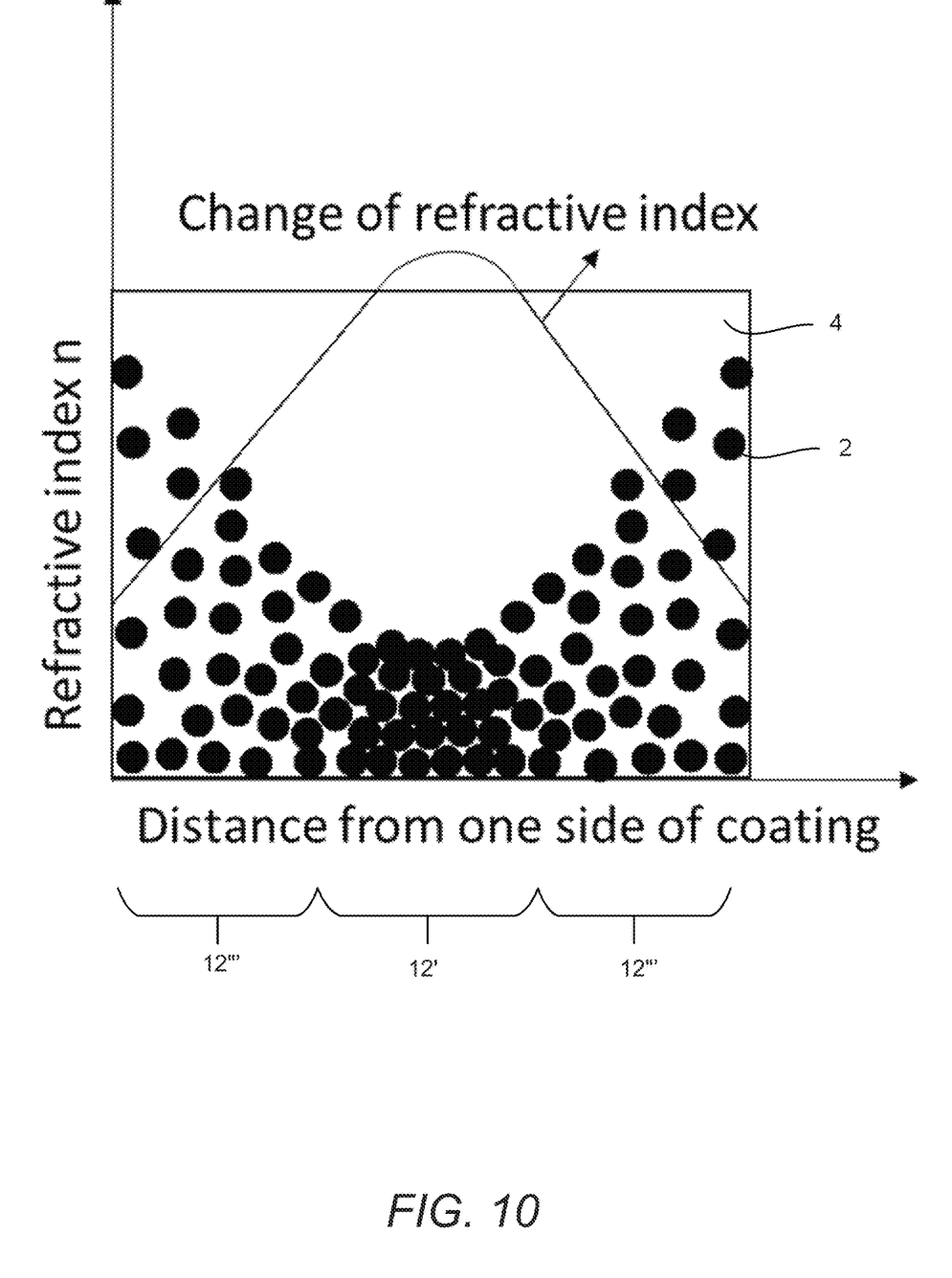
FIG. 10 is a coating according to another aspect of the invention.

As another example, the coating 8 can include an ordered spatial distribution of nanoparticles 2 in a parabolic shape, as shown in FIG. 10. In the coating 8, a second portion 12' of nanoparticles 2 can be centrally located (relative to left and right side of the coating), and/or concentrated along a surface/edge (e.g., a bottom surface) of the coating. The coating 8 can also include a fourth portion 12''', located on either or both sides (e.g., left or right sides) of the second portion 12', in which the fourth portion 12''' includes a random distribution of nanoparticles 2. The random distribution of nanoparticles 2 can extend throughout the fourth portion 12'''. The central, second portion 12' can include high refractive index nanoparticles 2, and the two fourth portions 12''' can each include low refractive index nanoparticles 2. In this manner, the ordered spatial distribution of nanoparticles can be a three-dimensional distribution of nanoparticles. This can be used to make flat lenses.

The coating 8 can have a physical thickness that depends upon the intended use of the coating 8 within an article or multilayer structure. In an aspect, the coating 8 can have a physical thickness ranging from about 100 nm to about 1,000,000 nm, for example, from about 1,000 nm to about 500,000 nm, and as a further example, from about 10,000 nm to about 100,000 nm.

The coating 8 can include a polymer medium 4. The polymer medium 4 can be any suitable medium for enabling an ordered spatial distribution for a plurality of nanoparticles 2. In particular, the polymer medium 4 can have a viscosity that can allow an initial movement of the plurality of nanoparticles 2. The polymer medium 4 can be chosen from an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The polymer chains in the polymer medium 4 can be crosslinked and cured. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization. Non-limiting examples of a curing process include a non-radical cure system, ultraviolet light, visible light, infrared, and electron beam.

The polymer medium 4 can include additives, for example, in addition to the plurality of nanoparticles 2. The additives can be dispersed in the polymer medium 4. The additives can include, but are not limited to, colorants, such as dyes and pigments; quantum dots; micelles; chalcogenides; leveling agents; photoinitiators; wetting aids; dispersants; curing agent; hardener; antioxidants; and combinations thereof.

The polymer medium 4 can include a dispersant, such as an ionic dispersant, such as an anionic dispersant, or a cationic dispersant; a non-ionic dispersant; and mixtures thereof. For example, the dispersant can be mixed with or combined with the polymer medium 4; or used to condition the nanoparticles 2 prior to being mixed with the polymer medium 4. In an aspect, the polymer medium 4 includes an ionic dispersant, such as one containing at least one functional group chosen from a carboxylate, a sulfonate, a sulfate, a phosphonate, a phosphate, and an organic ammonium. The functional group can bind to a surface of a particle, such as the disclosed nanoparticle 2, to impart a charge to the particle. In this manner, the charged particles can be repellant to one another, which can limit or inhibit aggregation and/or agglomeration of the particles in the polymer medium 4.

The plurality of nanoparticles 2 can be present in the coating 8 in an ordered spatial distribution. By an "ordered spatial distribution" is meant that the plurality of nanoparticles 2 can be physically spatially distributed within the polymer medium 4 of the coating 8 in an ordered or arranged manner. In particular, the plurality of nanoparticles 2 can be subjected to a force that orders the plurality of nanoparticles 2 in a particular physical spatial distribution within the polymer medium 4 of the coating 8. The ordered spatial distribution of the plurality of nanoparticles 2 cannot be a random dispersion or a uniform distribution within the polymer medium 4 of the coating 8. As discussed above, the ordered spatial distribution can include different portions within the coating 8.

In an aspect, the ordered spatial distribution can be a continuous gradient throughout the polymer medium 4 of the coating 8. For example, a physical concentration of the plurality of nanoparticles can taper between surfaces of the coating 8 thereby forming a continuous gradient throughout the coating 8, as shown in FIG. 5. In an aspect, the continuous gradient can be spherical, axial, or radial. Because the continuous gradient can be within the polymer medium 4 of the coating 8, a cheaper and/or thinner coating 8 can be obtained. This can be an advantage as compared to articles including multiple layers to provide a refractive index gradient across the multiple layers as opposed to within a coating 8, like the disclosed coating 8.

In another aspect, the ordered spatial distribution of the plurality of nanoparticles 2 can be a physical concentration along an edge, or a surface, of the polymer medium 4 within the coating 8, as shown in FIGS. 1-5 and 9. A first portion 12 of the coating 8 can be void, or include trace amounts, of the plurality of nanoparticles 2. A second portion 12' can include a high physical concentration of the plurality of nanoparticles 2, relative to a first portion 12. The first portion 12 can have a lower refractive index, such as approaching or similar to a refractive index of the neat polymer medium 4, after cure. The second portion 12' can have a high refractive index, such as approaching or similar to a refractive index of the material in the plurality of nanoparticles 2.

In a further aspect, a second portion 12 can have large physical concentration of the plurality of nanoparticles 2, and a fourth portion (not shown) of the polymer medium 4 can include a smaller physical concentration of the plurality of nanoparticles 2. In this instance, the plurality of nanoparticles 2 in the fourth portion would not be an ordered spatial distribution but could be randomly dispersed. In this manner, a coating 8 composition can include an ordered spatial distribution of a second portion 12 of a plurality of nanoparticles 2 and a random distribution of a remaining portion of a plurality of nanoparticles 2. For example, there can be controlled curing of the second portion 12 while leaving the fourth portion uncured. After removal of the force, the nanoparticles 2 in the fourth portion can become randomized again.

The plurality of nanoparticles 2 can include any particles having a nanoparticle 2 size, e.g., from about 1 nm to about 100 nm. The particles can include a material chosen from metals, metal oxides, metal carbonates, metal sulfides, metal fluorides, metal nitrides, organic compounds or polymers, and mixtures thereof. Non-limiting examples of metal oxides includes aluminum oxide, calcium oxide, cerium oxide, chromium oxide, cobalt oxide, copper oxide, iron oxide, lead oxide, magnesium oxide, nickel oxide, niobium oxide, silicon dioxide, silver oxide, tin oxide, and zinc oxide. Non-limiting examples of metal sulfides include barium sulfide, cobalt sulfide, copper sulfide, iron sulfide, manganese sulfide, nickel sulfide, silver sulfide, tin sulfide, titanium sulfide, and zinc sulfide. Non-limiting examples of metal fluorides include aluminum fluoride, barium fluoride, calcium fluoride, cerium fluoride, chromium fluoride, cobalt fluoride, copper fluoride, gold fluoride, iron fluoride, magnesium fluoride, nickel fluoride, niobium fluoride, silver fluoride, tin fluoride, and titanium fluoride. Non-limiting examples of organic compounds or polymers include polyimidothiethers, polyphosphonates, sulfur-containing polyimide, polyferrocenes, polyferrocenylsilanes, and organic-inorganic nanocomposites. The particles can include a magnetic and/or a ferromagnetic material.

The particles can have a refractive index, such as a high refractive index or a low refractive index. A particle with a high refractive index is defined herein as greater than about 1.65. A particle with a low refractive index is defined herein as about 1.65 or less. Non-limiting examples of a high refractive index nanoparticle 2 include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), cerium oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), combinations thereof, and the like. Non-limiting examples of a low refractive index nanoparticle 2 include silicon dioxide ($SiO_2$), aluminum oxide ($Al_2O_3$), magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), and combinations thereof.

The plurality of nanoparticles 2 can include particles, as disclosed above, that are the same or different. For example, the plurality of nanoparticles 2 can be the same material, the same refractive index, the same density. The plurality of nanoparticles 2 can be different so that the plurality of nanoparticles 2 is a mixture of different parts. For example, a first part, of the plurality of nanoparticles 2, can have a low density (mass per unit volume) relative to a density of the polymer medium 4; and a second part can have a high density relative to the density of the polymer medium 4. Any method can be used to measure the density because the density of one portion is relative to a density of the polymer medium 4. As another example, the plurality of nanoparticles 2 can include a first part of magnetic nanoparticles 2, and a second part of non-magnetic particles.

The coating 8 can be applied to a substrate 6 to produce an article, as shown in FIG. 2. The substrate 6 can be any material capable of receiving the coating 8. For example, the substrate 6 can be plastic, glass, a web. A surface of the substrate 6 can be smooth and/or planar or can be diffractive. For example, the substrate 6 can be a planar glass lens. As another example, the substrate 6 can be an engineered diffuser.

A method of making of making the coating 8 is also disclosed herein. As shown in FIG. 7, the method includes dispersing a plurality of nanoparticles 2 in a polymer medium 4; applying a field (or force) to the polymer medium 4, wherein the field is chosen from an electromagnetic, an electric, a magnetic, a gravitational, and a combination thereof; and ordering the plurality of nanoparticles 2 in a spatial distribution within the polymer medium 4 parallel to the field.

The polymer medium 4 can include an ionic dispersant and the plurality of nanoparticles 2. In this manner, ionic functional groups on the ionic dispersant bind to the plurality of nanoparticles 2 resulting in charged nanoparticles 2. An electric field can be applied to the polymer medium 4, i.e., uncured coating, so that the charged nanoparticles 2 can be ordered in a spatial distribution that is parallel to the applied field. In this manner, a continuous gradient of nanoparticles 2 is formed throughout the polymer medium 4.

A strength of the applied field can be selected based upon a desired ordered spatial distribution of the plurality of nanoparticles 2. The strength of the applied field can be dependent on the thickness of the coating 8, the amount of charge on the nanoparticles 2, and/or any dielectric properties of the polymer medium 4. A pattern of the applied field can also determine the ordered spatial distribution of nanoparticles 2.

Additionally, the plurality of nanoparticles 2 can be exposed to the applied field for a period of time based upon a desired ordered spatial distribution of the plurality of nanoparticles 2. The exposure time for the applied field can be dependent on the thickness of the coating 8, the amount of charge on the nanoparticles 2, and/or any dielectric properties of the polymer medium 4.

The method can also include curing of the ordered spatial distribution of the plurality of nanoparticles 2 in the polymer medium 4. Any method can be used to cure, such as those disclosed herein. The cured coating 8 can prevent the plurality of nanoparticles 2 from moving thereby permanently setting ordered spatial distribution of the plurality of nanoparticles 2 in the polymer medium 4.

In an aspect, the field applied to the polymer medium 4 can be a magnetic field. The plurality of nanoparticles 2 can include particles with a magnetic material, particles without a magnetic material, or a mixture of both.

In an aspect, the field applied to the polymer medium 4 is a gravitational field/force and/or a centrifugal field/force. The plurality of nanoparticles 2 can include particles with a low density, particles with a high density, or a mixture of both, wherein the density is relative to a density of the polymer medium 4. Upon application of the field, a second portion 12' of nanoparticles 2 with a high density move to a bottom (directional) region of the polymer medium 4 and/or a third portion 12" move to a top (directional) region of the polymer medium 4.

The plurality of nanoparticles 2 can include a first part of magnetic nanoparticles 2 and a second part of charged nanoparticles 2. In this manner, more than one field can be applied to the nanoparticles 2, such as a magnetic field and an electric field, in order to provide the ordered spatial distribution of the plurality of nanoparticles 2. An electric field can move the charged nanoparticles 2 to a first side/edge of the polymer medium 4, and a magnetic field can move the magnetic nanoparticles 2.

Figure 8:
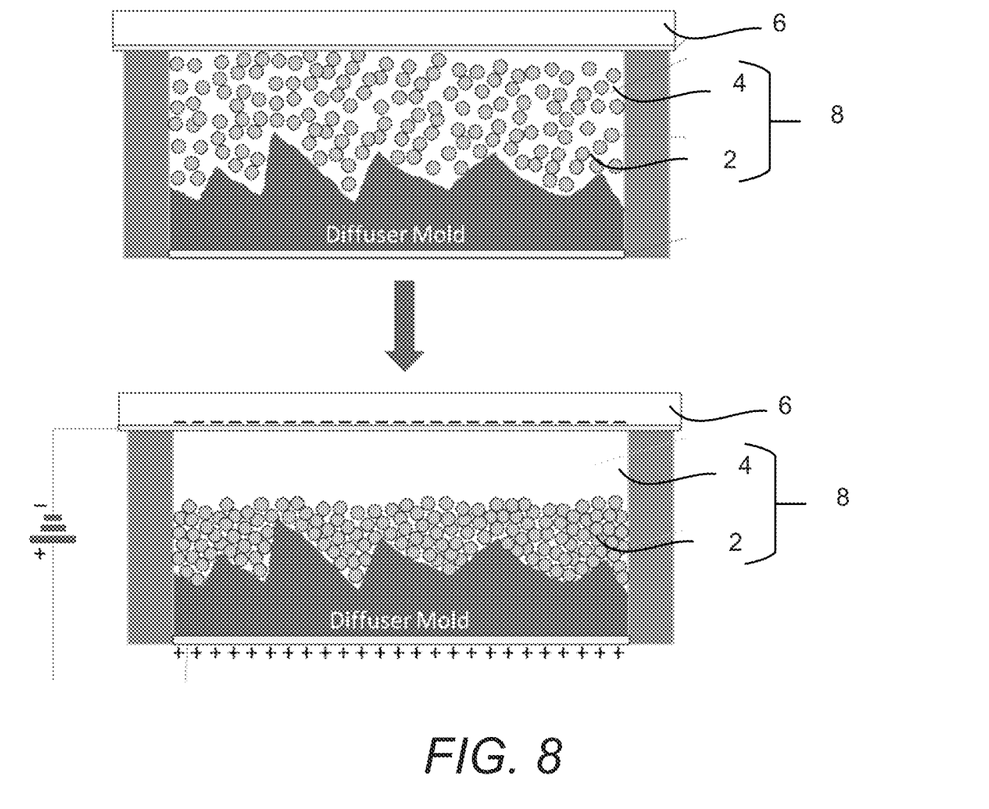
FIG. 8 is an illustration of a method of making a coating according to another aspect of the invention.

As shown in FIG. 8, the method can also include providing a diffuser mold; applying a polymer medium 4 including a plurality of nanoparticles 2 to the diffuser mold so that the polymer medium 4 mimics a shape of the mold; applying a substrate 6 to the polymer medium 4; applying a field to the polymer medium 4 to order in a spatial distribution the plurality of nanoparticles 2; curing the polymer medium 4 while still in the applied field; and removing the diffuser mold.

A multilayer structure can include the coating 8 disclosed herein. The coating 8 can be adjacent to an additional layer 10, such as a high refractive index layer, as shown in FIGS. 1-5. The multilayer structure can also include a first additional layer 10, such as a high refractive index layer, and a second additional layer 10', such as a low refractive index layer adjacent to the coating 8. In particular, the coating 8 can be between a high refractive index layer and a low refractive index layer. The coating 8 can include an ordered spatial distribution of a plurality of nanoparticles 2 that matches the adjacent refractive indices of the multilayer structure. The high refractive index layer and the low refractive index layer each independently include particles for their respective refractive index, as disclosed herein.

A method of making a multilayer structure can comprise depositing a low refractive index (LRI) layer; depositing, on the low refractive index layer, a coating 8 including an ordered spatial distribution of a plurality of nanoparticles 2 and a polymer medium 4; and applying a field to the polymer medium 4. The low refractive index layer can include low refractive index particles. The field can be any field, as discussed herein, that can order the plurality of nanoparticles 2 away from the low refractive index layer. In particular, by controlling a strength of the field, such as an electric field, and a period of time of applying the field, the ordered spatial distribution of nanoparticles 2 can be obtained. For example, a first portion 12 of the coating 8, located near an interface with the low refractive index layer, can include a small and/or trace amount of nanoparticles 2; and a second portion 12' of the coating 8, located opposite the interface with the low refractive index layer, can include a large and/or high amount of nanoparticles 2. The method can further include, after curing, depositing a high refractive index (HRI) layer onto the coating 8. A multilayer structure can exhibit reduced scattering because the coating 8 can be designed to index match with adjacent layers thereby reducing diffraction at an interface between the LRI and the coating 8, and an interface between the HRI and the coating 8.

The multilayer structure can include the coating 8 disclosed herein and a HRI layer. As shown in FIG. 5, the coating 8 can be designed to provide a refractive index gradient between the HRI layer and air. In particular, the plurality of nanoparticles 2 can be spatially distributed to include a first portion 12 of the coating 8, located near an interface with air, can include a small and/or trace amount of nanoparticles 2; and a second portion 12' of the coating 8, located near an interface with the high refractive index layer, can include a large and/or high amount of nanoparticles 2. A refractive index of the first portion 12 of the coating 8 is low and can closely match a refractive index of air. A refractive index of the second portion 12' of the coating 8 is high and can closely match a refractive index of the HRI layer.

An optical device can include the coating 8 on a substrate 6. The substrate 6 can be a planar lens. A surface of the coating 8, such as a bottom surface, can be shaped by an engineered diffuser mold.

The method for making a multilayer structure is similar to that discussed above except that the initial step is depositing a HRI layer so that the coating 8 is deposited on the HRI layer.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device comprising:
a substrate; and
a coating on the substrate, the coating including a first portion at a first edge and a second portion at a second edge opposite the first edge, the coating comprising an ordered spatial distribution of a plurality of nanoparticles in a polymer medium, wherein the ordered spatial distribution is non-random and based upon at least one of an electric field, a magnetic field, a gravitational field, or a refractive index of the plurality of nanoparticles,
wherein the ordered spatial distribution is not a uniform distribution within the polymer medium, wherein the ordered spatial distribution is a concentration of the plurality of nanoparticles along the second edge of the coating and the second portion includes a high physical concentration of the plurality of nanoparticles relative to the first portion, and
wherein the optical device is a light diffuser.

2. The coating of claim 1, wherein the ordered spatial distribution of nanoparticles includes a parabolic shape with a portion of concentrated nanoparticles centrally located along a surface of the coating.

3. The coating of claim 1, wherein the coating has zero coating interfaces within the coating.

4. The optical device of claim 1, wherein the coating is shaped, at the second edge of the coating, using an engineered diffuser mold for diffusing light.

5. The optical device of claim 1, wherein the first portion is void of the plurality of nanoparticles.

6. An optical device, comprising:
a substrate, wherein the substrate is a planar lens;
a coating on the substrate, the coating including a first portion at a first edge and a second portion at a second edge opposite the first edge, the coating comprising an ordered spatial distribution of a plurality of nanoparticles in a polymer medium,
wherein the ordered spatial distribution is not a uniform distribution within the polymer medium, wherein the ordered spatial distribution is a concentration of the plurality of nanoparticles along the second edge of the coating and the second portion includes a high physical concentration of the plurality of nanoparticles relative to the first portion.

7. The optical device of claim 6, wherein the ordered spatial distribution comprises a continuous gradient throughout the polymer medium.

8. The optical device of claim 6, wherein the coating comprises a single layer.

9. The optical device of claim 6, wherein the coating comprises zero coating interfaces within the coating.

10. The optical device of claim 6, wherein the first portion is void of the plurality of nanoparticles.

11. A multilayer structure comprising:
a coating comprising an ordered spatial distribution of a plurality of nanoparticles and a polymer medium, the coating including a first portion at a first edge and a second portion at a second edge opposite the first edge;
a high refractive index layer adjacent to the coating and having a first refractive index; and
a low refractive index layer adjacent to the coating, the low refractive index coating having a second refractive index that is lower that the first refractive index, the coating being between the high refractive index layer and the low refractive index layer,
wherein the ordered spatial distribution is not a uniform distribution within the polymer medium, wherein the ordered spatial distribution is a concentration of the plurality of nanoparticles along the second edge of the coating and the second portion includes a high physical concentration of the plurality of nanoparticles relative to the first portion, wherein the ordered spatial distribution is non-random and based upon at least one of an electric field, a magnetic field, a gravitational field, or a refractive index of the plurality of nanoparticles; and
wherein the ordered spatial distribution provides a different refractive index for the first portion of the coating than for the second portion of the coating, thereby closely matching the refractive index of the coating at an interface between the low refractive index layer and the coating, and closely matching the refractive index of the coating at an interface between the high refractive index layer and the coating.

12. The coating of claim 11, wherein the ordered spatial distribution is a continuous gradient throughout the polymer medium.

13. The multilayer structure of claim 11, wherein the first portion is void of the plurality of nanoparticles.

* * * * *